US009638175B2

(12) United States Patent
Kalina

(10) Patent No.: US 9,638,175 B2
(45) Date of Patent: May 2, 2017

(54) POWER SYSTEMS UTILIZING TWO OR MORE HEAT SOURCE STREAMS AND METHODS FOR MAKING AND USING SAME

(71) Applicant: Alexander I. Kalina, Hillsborough, CA (US)

(72) Inventor: Alexander I. Kalina, Hillsborough, CA (US)

( * ) Notice: Subject to any disclaimer, the term of this patent is extended or adjusted under 35 U.S.C. 154(b) by 0 days.

(21) Appl. No.: 13/654,910

(22) Filed: Oct. 18, 2012

(65) Prior Publication Data
US 2014/0109573 A1    Apr. 24, 2014

(51) Int. Cl.
| F01K 25/06 | (2006.01) |
| F01K 25/08 | (2006.01) |
| F01K 25/00 | (2006.01) |
| F03G 7/00 | (2006.01) |

(52) U.S. Cl.
CPC ...................... F03G 7/00 (2013.01)

(58) Field of Classification Search
USPC ................... 60/649, 651, 671, 673
See application file for complete search history.

(56) References Cited

U.S. PATENT DOCUMENTS

| 3,995,429 A | | 12/1976 | Peters | |
| 4,346,561 A | * | 8/1982 | Kalina | ............................ 60/673 |
| 4,489,563 A | * | 12/1984 | Kalina | ............................ 60/673 |
| 4,548,043 A | * | 10/1985 | Kalina | ............................ 60/673 |
| 4,586,340 A | * | 5/1986 | Kalina | ............................ 60/673 |
| 4,604,867 A | * | 8/1986 | Kalina | ............................ 60/653 |
| 4,732,005 A | * | 3/1988 | Kalina | ............................ 60/673 |
| 4,899,545 A | * | 2/1990 | Kalina | ............................ 60/673 |
| 4,982,568 A | * | 1/1991 | Kalina | ............................ 60/649 |
| 5,029,444 A | * | 7/1991 | Kalina | ............................ 60/673 |
| 5,095,708 A | * | 3/1992 | Kalina | ............................ 60/673 |
| 5,440,882 A | * | 8/1995 | Kalina | ........................ 60/641.2 |
| 5,572,871 A | * | 11/1996 | Kalina | ............................ 60/649 |
| 5,649,426 A | * | 7/1997 | Kalina et al. | ................... 60/649 |
| 5,822,990 A | * | 10/1998 | Kalina et al. | ................... 60/649 |
| 5,950,433 A | * | 9/1999 | Kalina | ............................ 60/649 |
| 5,953,918 A | * | 9/1999 | Kalina et al. | ................... 60/653 |
| 6,058,695 A | * | 5/2000 | Ranasinghe et al. | ...... 60/39.182 |
| 6,523,347 B1 | | 2/2003 | Jirnov et al. | |
| 6,735,948 B1 | * | 5/2004 | Kalina | ............................ 60/649 |
| 6,769,256 B1 | * | 8/2004 | Kalina | ............................ 60/653 |
| 7,021,060 B1 | * | 4/2006 | Kalina | ............................ 60/649 |
| 7,055,326 B1 | * | 6/2006 | Kalina | ............................ 60/649 |
| 7,065,967 B2 | * | 6/2006 | Kalina | ............................ 60/649 |
| 8,272,217 B2 | * | 9/2012 | Lengert | .......................... 60/649 |

(Continued)

FOREIGN PATENT DOCUMENTS

CN    1896501 A    1/2007

OTHER PUBLICATIONS

PCT IRS, mailed Mar. 11, 2014.

Primary Examiner — Thomas Denion
Assistant Examiner — Mickey France
(74) Attorney, Agent, or Firm — Robert W Strozier

(57) ABSTRACT

Power systems utilizing at least two heat source streams with substantially different initial temperatures, where the systems include a simple vaporization, separation, and energy extraction subsystem, a recycle subsystem, and a condensation and pressurization subsystem and methods for making and using same.

30 Claims, 3 Drawing Sheets

(56) References Cited

U.S. PATENT DOCUMENTS

| | | | |
|---|---|---|---|
| 2004/0050048 A1* | 3/2004 | Kalina | 60/641.2 |
| 2004/0055302 A1* | 3/2004 | Kalina | 60/649 |
| 2004/0148935 A1* | 8/2004 | Kalina | 60/649 |
| 2004/0182084 A1* | 9/2004 | Kalina | 60/698 |
| 2005/0050891 A1* | 3/2005 | Kalina | 60/649 |
| 2005/0066660 A1* | 3/2005 | Mirolli et al. | 60/651 |
| 2005/0183418 A1* | 8/2005 | Kalina | 60/517 |
| 2005/0235645 A1* | 10/2005 | Kalina | 60/649 |
| 2006/0096288 A1* | 5/2006 | Kalina | 60/649 |
| 2006/0096289 A1* | 5/2006 | Kalina | 60/649 |
| 2006/0096290 A1* | 5/2006 | Kalina | 60/649 |
| 2007/0056284 A1* | 3/2007 | Kalina | 60/618 |
| 2007/0068161 A1* | 3/2007 | Kalina | 60/651 |
| 2007/0234722 A1* | 10/2007 | Kalina | 60/645 |
| 2007/0245733 A1* | 10/2007 | Pierson et al. | 60/651 |
| 2008/0000225 A1* | 1/2008 | Kalina | 60/517 |
| 2008/0053095 A1* | 3/2008 | Kalina | 60/649 |
| 2009/0205336 A1* | 8/2009 | Blonn et al. | 60/649 |
| 2010/0101227 A1* | 4/2010 | Kalina | 60/653 |
| 2010/0122533 A1* | 5/2010 | Kalina | 60/645 |
| 2010/0146973 A1* | 6/2010 | Kalina | 60/653 |
| 2010/0205962 A1* | 8/2010 | Kalina | 60/641.8 |
| 2011/0067400 A1* | 3/2011 | Kalina | 60/651 |
| 2011/0185727 A1* | 8/2011 | Kalina | 60/641.8 |
| 2011/0259011 A1* | 10/2011 | Kalina | 60/653 |
| 2011/0289922 A1* | 12/2011 | Myers et al. | 60/651 |
| 2012/0006024 A1* | 1/2012 | Hays et al. | 60/651 |
| 2013/0213040 A1* | 8/2013 | Goswami et al. | 60/647 |
| 2013/0247570 A1* | 9/2013 | Lehar et al. | 60/643 |

\* cited by examiner

POWER SYSTEMS UTILIZING TWO OR MORE HEAT SOURCE STREAMS AND METHODS FOR MAKING AND USING SAME

BACKGROUND OF THE INVENTION

1. Field of the Invention

Embodiments of the present invention relate to power systems utilizing at least two heat source streams with substantially different initial temperatures, and to methods for making and using same.

More particularly, embodiments of the present invention relate to power systems utilizing at least two heat source streams with substantially different initial temperatures, where the systems include a simple vaporization, separation, and energy extraction subsystem, a recycle subsystem, and a condensation and pressurization subsystem. The present invention also relates to methods for making and using same.

2. Description of the Related Art

In geothermal applications, it is common for several initial wells to be drilled before a production well having an adequately high source temperature is located within a geothermal field. These initial wells deliver geothermal streams having temperatures lower than that of a well that will eventually be used as the production well. The drilling of these initial wells, which are then not utilized for energy extraction, is considered to be an inevitable part of the geothermal field cost.

Thus, there is a need in the art for power generation systems that are capable of utilizing streams derived from initial and production wells.

SUMMARY OF THE INVENTION

Embodiments of this invention relate to systems for generating power from at least one lower temperature heat source stream from at least one initial geothermal well and at least one higher temperature heat source stream from at least one production geothermal well. The system comprises a vaporization subsystem. The vaporization subsystem includes a booster pump to increase a pressure of an intermediate pressure rich solution stream forming a higher pressure rich solution stream. The vaporization subsystem also includes a lower temperature heat exchange portion to partially vaporize the higher pressure rich solution stream using a combined heat source stream comprising a cooled higher temperature heat source stream and a lower temperature heat source stream. The vaporization subsystem also includes a higher temperature heat exchange portion to further vaporize the higher pressure rich solution stream. The vaporization subsystem also includes a first separator to separate the further vaporized higher pressure rich solution stream into a higher pressure lean liquid stream and a higher pressure vapor richer solution stream. The system also comprises an energy extraction subsystem. The energy extraction subsystem includes at least one turbine to convert a portion of thermal energy in the higher pressure vapor richer solution stream into a usable form of energy forming a lower pressure richer solution stream. The system also comprises a separation and pressure reduction subsystem. The separation and pressure reduction subsystem includes a first throttle control valve to reduce a pressure of the higher pressure lean liquid stream to form an intermediate vapor-liquid lean stream. The separation and pressure reduction subsystem also includes a second separator to separate the intermediate vapor-liquid lean stream into an intermediate pressure rich vapor stream and an intermediate pressure leaner liquid stream. The separation and pressure reduction subsystem includes a first mixing valve to combine the intermediate pressure lean solution stream and the intermediate pressure rich vapor stream forming the intermediate pressure rich solution stream. The separation and pressure reduction subsystem includes a second throttle control valve to reduce the pressure of the intermediate pressure leaner liquid stream forming a lower pressure leaner liquid stream. The separation and pressure reduction subsystem includes a second mixing valve to combine the lower pressure leaner liquid stream and the lower pressure richer solution stream. The system also comprises a condensation subsystem including a condenser to fully condense a lower pressure lean solution stream forming the lower pressure fully condensed lean solution stream. The systems utilize streams comprising a multi-component working fluid. In certain embodiments, the multi-component working fluid comprises at least one lower boiling point component and at least one higher boiling point component. In other embodiments, the multi-component fluid is selected from the group consisting of an ammonia-water mixture, a mixture of two or more hydrocarbons, a mixture of two or more halocarbons, a mixture of hydrocarbons and halocarbons, and mixtures thereof. In other embodiments, the multi-component fluid comprises a mixture of compounds having favorable thermodynamic characteristics and solubilities. In other embodiments, the multi-component fluid comprises a mixture of water and ammonia. In other embodiments, a flow rate of the higher temperature heat source stream is substantially lower than a flow rate of the lower temperature heat source stream. In other embodiments, the flow rate of the higher temperature heat source stream is as low as 25% of the flow rate of the lower temperature heat source stream. In other embodiments, the higher temperature heat source stream is adjusted so that the flow rate is sufficient to provide as much heat as is required in the third heat exchange process. In other embodiments, if the flow rate of the higher temperature heat source stream is too small to provide the required heat for the third heat exchange process, then a temperature of the higher pressure partially vaporized rich solution stream is reduced so as to provide a balance between the heating process and the cooling process of the third heat exchange process. In other embodiments, if the flow rate of the higher temperature heat source stream is too small to provide the required heat for the third heat exchange process, then a temperature difference between a temperature of the lower temperature heat source stream and a temperature of the higher pressure rich solution stream at the point within the second heat exchanger is increased so that the utilization of available heat from the lower temperature heat source stream is reduced. In other embodiments, a total power output of the systems is reduced. In other embodiments, the heat source streams are varied to optimize a power output of the system. In other embodiments, the temperature differences between the heat source streams and the working fluid streams in the second heat exchange unit and the third heat exchange unit are substantially reduced as compared to a system using only the higher temperature heat source stream. In other embodiments, a thermodynamic irreversibility of heat transfer from the heat source streams to the working fluid streams is substantially reduced in the system and the system has a substantially higher 2nd Law efficiency ($1-T_C/T_H$, where $T_C$ is the temperature of the cooled heat source stream and $T_H$ is the temperature of the higher temperature heat source stream) as compared to a system that utilizes only the higher temperature heat source stream. In other embodiments, a thermal efficiency of the system ($1-Q_{out}/Q_{in}$, where $Q_{in}$ is the heat transferred from the higher temperature source to the system and $Q_{out}$ is the heat transferred from the system to the low temperature sink) remains as high as a system using only the higher temperature heat source stream. In other embodiments, a total power produced in the system is substantially higher than a system using a mixture of higher temperature source stream and lower temperature heat source stream. In other embodiments, the lower temperature heat source stream comprises initial wells drilled into a geothermal field and the higher temperature heat source stream comprises production wells in the geothermal field.

Embodiments of this invention relate to methods for generating power from at least one lower temperature heat source stream from at least one initial geothermal well and at least one higher temperature heat source stream from at least one production geothermal well. The methods for power generation comprise increasing a pressure of an intermediate pressure rich solution stream forming a higher pressure rich solution stream in a booster pump of a vaporization subsystem, partially vaporizing the higher pressure rich solution stream using a combined heat source stream comprising a cooled higher temperature heat source stream and a lower temperature heat source stream in a lower temperature heat exchange portion of the vaporization subsystem, further vaporizing the higher pressure rich solution stream in a higher temperature heat exchange portion of the vaporization subsystem, and separating the further vaporized higher pressure rich solution stream into a higher pressure lean liquid stream and a higher pressure vapor richer solution stream in a first separator. The methods also include converting a portion of thermal energy in the higher pressure vapor richer solution stream into a usable form of energy forming a lower pressure richer solution stream in at least one turbine of an energy extraction subsystem. The methods also comprise reducing a pressure of the higher pressure lean liquid stream to form an intermediate vapor-liquid lean stream in a first throttle control valve of a separation and pressure reduction subsystem, separating the intermediate vapor-liquid lean stream into an intermediate pressure rich vapor stream and an intermediate pressure leaner liquid stream in a second separator of the separation and pressure reduction subsystem, combining the intermediate pressure lean solution stream and the intermediate pressure rich vapor stream forming the intermediate pressure rich solution stream in a first mixing valve of the separation and pressure reduction subsystem, reducing the pressure of the intermediate pressure leaner liquid stream forming a lower pressure leaner liquid stream in a second throttle control valve of the separation and pressure reduction subsystem, and combining the lower pressure leaner liquid stream and the lower pressure richer solution stream in a second mixing valve of the separation and pressure reduction subsystem. The methods also comprise fully condensing a lower pressure lean solution stream forming the lower pressure fully condensed lean solution stream in a condenser of a condensation subsystem. The methods utilize a multi-component working fluid. In certain embodiments, the multi-component working fluid comprises at least one lower boiling point component and at least one higher boiling point component. In other embodiments, the multi-component fluid is selected from the group consisting of an ammonia-water mixture, a mixture of two or more hydrocarbons, a mixture of two or more halocarbons, a mixture of hydrocarbons and halocarbons, and mixtures thereof. In other embodiments, the multi-component fluid comprises a mixture of compounds having favorable thermodynamic characteristics and solubilities. In other embodiments, the multi-component fluid comprises a mixture of water and ammonia. In other embodiments, a flow rate of the higher temperature heat source stream is substantially lower than a flow rate of the lower temperature heat source stream. In other embodiments, the flow rate of the higher temperature heat source stream is as low as 25% of the flow rate of the lower temperature heat source stream. In other embodiments, the higher temperature heat source stream is adjusted so that the flow rate is sufficient to provide as much heat as is required in the third heat exchange process. In other embodiments, if the flow rate of the higher temperature heat source stream is too small to provide the required heat for the third heat exchange process, then a temperature of the higher pressure partially vaporized rich solution stream is reduced so as to provide a balance between the heating process and the cooling process of the third heat exchange process. In other embodiments, if the flow rate of the higher temperature heat source stream is too small to provide the required heat for the third heat exchange process, then a temperature difference between a temperature of the lower temperature heat source stream and a temperature of the higher pressure rich solution stream at the point within the second heat exchanger is increased so that the utilization of available heat from the lower temperature heat source stream is reduced. In other embodiments, a total power output of the systems is reduced. In other embodiments, the heat source streams are varied to optimize a power output of the system. In other embodiments, the temperature differences between the heat source streams and the working fluid streams in the second heat exchange unit and the third heat exchange unit are substantially reduced as compared to a system using only the higher temperature heat source stream. In other embodiments, a thermodynamic irreversibility of heat transfer from the heat source streams to the working fluid streams is substantially reduced in the system and the system has a substantially higher 2nd Law efficiency as compared to a system that utilizes only the higher temperature heat source stream. In other embodiments, a thermal efficiency of the system remains as high as a system using only the higher temperature heat source stream. In other embodiments, a total power produced in the system is substantially higher than a system using a mixture of higher temperature source stream and lower temperature heat source stream. In other embodiments, the lower temperature heat source stream comprises initial wells drilled into a geothermal field and the higher temperature heat source stream comprises production wells in the geothermal field.

BRIEF DESCRIPTION OF THE DRAWINGS

The invention can be better understood with reference to the following detailed description together with the appended illustrative drawings in which like elements are numbered the same.

DETAILED DESCRIPTION OF THE INVENTION

Figure 1A:
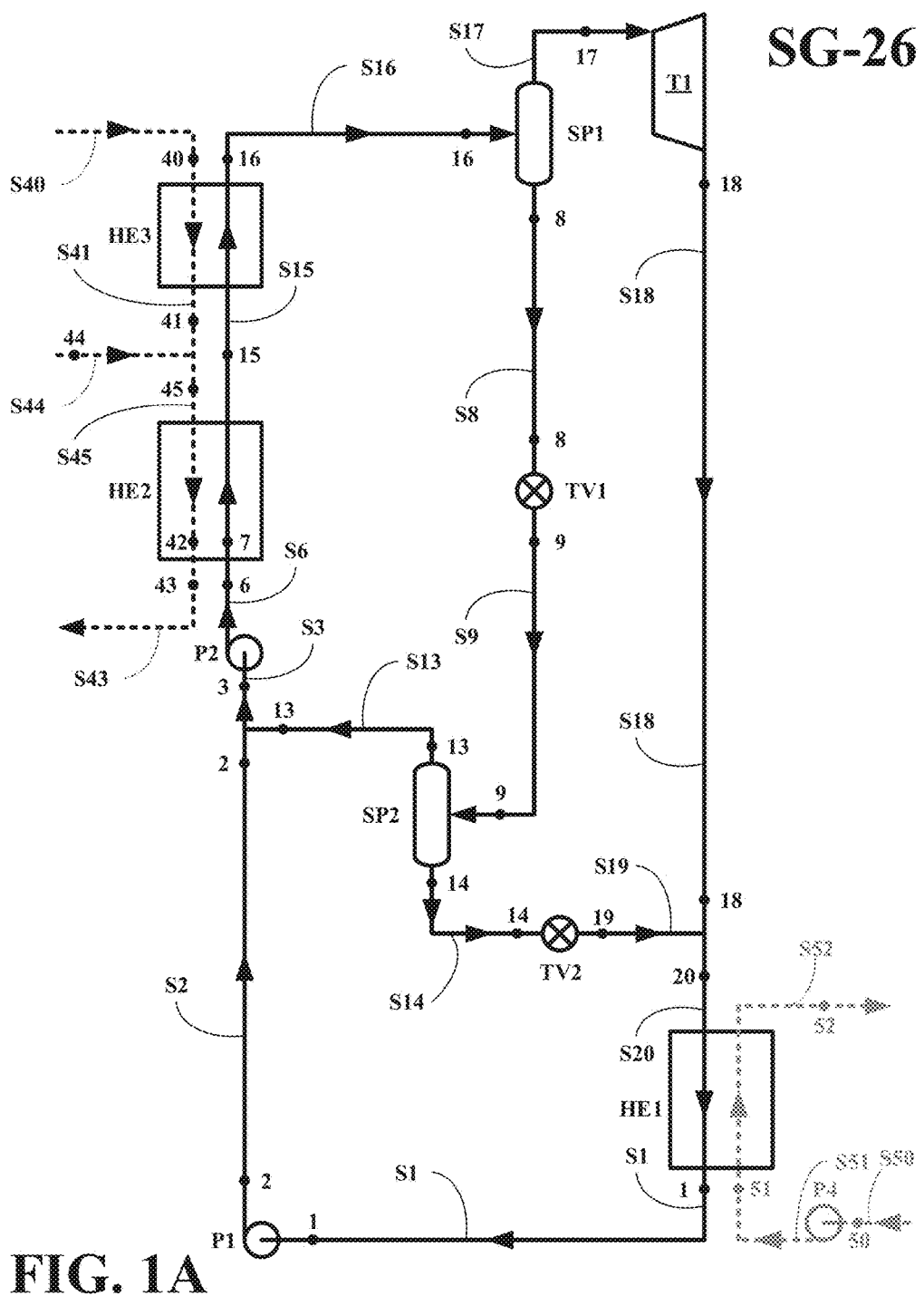
FIG. 1A depicts an embodiment of a power system for extracting energy from a production geothermal well and at least one initial geothermal well using a liquid coolant and a pump P4.

The inventor has found that power systems may be constructed that extract energy from a combination of at least one lower temperature heat source stream from at least one initial well in a geothermal field and at least one higher temperature heat source stream from at least one production well in the geothermal field. While it is possible, using a conventional power system, to simply mix higher temperature and lower temperature heat source streams, such mixing causes thermodynamic irreversibility, drastically reducing efficiency that may be attained from using the mixed streams. Therefore, in the prior art, the lower temperature heat sources have simply not been used.

In the present systems, power is generated by using both types of heat source streams, lower temperature heat source streams and higher temperature heat source streams from a geothermal field. The use of both types of streams from the same geothermal field is possible because the working fluid of the present system is a multi-component working fluid and has variable compositions throughout the systems. This means that the boiling point of the working fluid occurs at variable temperatures. The multi-component working fluid includes at least one lower boiling point component and at least one higher boiling point component. Therefore, with a properly selected working fluid composition, in which there is a high concentration of the lower boiling component called a rich solution, the heat consumption in a low temperature portion of a vaporization or boiling subsystem is much greater than the heat consumption in a high temperature portion of the vaporization or boiling subsystem. As a result of using a multi-component working fluid, the present invention system may be constructed so that a separate higher temperature heat source stream is used in the high temperature portion of the vaporization or boiling subsystem, and then, subsequently, a combined stream including a somewhat cooled higher temperature heat source stream and at least one lower temperature heat source stream for the low temperature portion of the vaporization or boiling subsystem.

Because a maximum temperature of the working fluid in the systems of this invention is defined by a maximum initial temperature of the higher temperature heat source stream, the thermal efficiency of the systems as a whole is the same as if all of the heat used in the system came from a single higher temperature heat source stream (i.e., the thermal efficiency of the systems is related to a maximum initial temperature of the higher temperature heat source stream). However, the total quantity of heat available to the systems is drastically increased by using the lower temperature heat source streams in the low portion of the boiling subsystem. This allows for the production of much more power than would be possible with only the higher temperature heat source stream, but the thermal efficiency of the system remains as high as it would have been if the lower temperature heat source stream had not been used.

Suitable Reagents and Equipment

The working fluid used in the systems of this invention are multi-component fluids comprising a lower boiling point component and a higher boiling point component. Suitable multi-components fluids include, without limitation, ammonia-water mixtures, mixtures of two or more hydrocarbons, mixtures of two or more FREON® compounds (halocarbons) (FREON® is a registered trademark of E. I. du Pont de Nemours and Company), mixtures of hydrocarbons and halocarbons, or mixtures thereof. In general, the fluid may comprise mixtures of any number of compounds with favorable thermodynamic characteristics and solubility. In certain embodiments, the multi-component fluid comprises a mixture of water and ammonia.

It should be recognized by an ordinary artisan that at those points in the systems of this invention where a stream is split into two or more sub-streams, dividing valves that affect such stream splitting are well known in the art and may be manually adjustable or dynamically adjustable so that the splitting achieves the desired stream flow rates and system efficiencies. Similarly, when streams are combined, combining valve that affect such stream combining are also well known in the art and may be manually adjustable or dynamically adjustable so that the splitting achieves the desired stream flow rates and system efficiencies.

Specific Embodiments

Referring now to FIG. 1, a fully condensed lean solution stream S1 having parameters as at a point 1 at a first and lowest pressure is pumped to a second pressure and higher pressure that is lower than a third pressure and highest pressure of the streams S6, S15, S16 and S17 in a vaporization or boiling subsystem as described below by a booster pump P1 to form a pressurized, fully condensed lean solution stream S2 having parameters as at a point 2. The fully condensed lean solution stream S1 has a low concentration of the lower boiling component of the multi-component working fluid. The pressurized, fully condensed lean solution stream S2 corresponds to a state of a subcooled liquid.

The pressurized, fully condensed lean solution stream S2 is then mixed with a second saturated rich vapor stream S13 having parameters as at a point 13 as described below. As a result of being mixed with the pressurized, fully condensed lean solution stream S2, the vapor stream S13 is fully absorbed by the lean solution stream S2 forming a saturated or slightly subcooled liquid rich solution stream S3 having parameters as at a point 3. The system is designed so that a total flow rate of the rich solution stream S3 is higher than a flow rate of the streams S1 and S2 due to the absorption of the rich vapor stream S13.

The rich solution stream S3 is then sent into a feed pump P2, and pumped to the third pressure, which is a desired elevated pressure, forming a liquid rich solution stream S6 having parameters as at a point 6, corresponding to a state of subcooled liquid.

The subcooled liquid rich solution stream S6 is then sent into a lower temperature portion of the vaporization subsystem comprising a second heat exchange unit or a lower temperature boiler HE2, where it is heated in counter flow with a combined heat source stream S45 in a second heat exchange process 45-42-43 or 6-7-15 obtaining parameters as at a point 7 within the second heat exchange unit HE2 and boils exiting the second heat exchange unit HE2 to form a partially vaporized rich solution stream S15 having parameters as at a point 15, corresponding to a state of a boiling vapor-liquid mixture.

Thereafter, the rich solution stream S15 enters into a higher temperature portion of the vaporization subsystem comprising a third heat exchange unit or a higher temperature boiler HE3, where the rich solution stream S15 is further heated in counter flow with a higher temperature heat source stream S40 having parameters as at a point 40 in a third heat exchange process 40-41 or 15-16 to form a further vaporized rich solution stream S16 having parameters as at a point 16, corresponding to a state of a vapor-liquid mixture and a cooled higher temperature heat source stream S41 having parameters as at a point 41. Note that there is less liquid and more vapor in the vapor-liquid rich solution stream S16 than in the less vaporized rich solution stream S15.

The rich solution stream S16 is then forwarded into a first gravity separator SP1, where the rich solution stream S16 is separated into a vapor richer solution stream S17 having parameters as at a point 17 and a first saturated lean liquid stream S8 having parameters as at a point 8.

The first lean liquid stream S8 is then sent through a first throttle valve TV1, where its pressure is reduced to a pressure equal or substantially equal to the second pressure, which is the pressure of the lean solution stream S2 as described above to form a vapor-liquid stream S9 having parameters as at a point 9, corresponding to a state of a vapor-liquid mixture at the second pressure.

The mixed stream S9 is then forwarded to a second gravity separator SP2, where it is separated into the second saturated rich vapor stream S13 having the parameters as at the point 13 as described above and a second saturated lean liquid stream S14 having parameters as at a point 14.

Meanwhile, the stream S17 is sent into a turbine T1, where it is expanded and a portion of its heat is converted into a usable form of energy such as mechanical and/or electrical energy or power forming a spent stream S18 having parameters as at a point 18, corresponding to a state of wet vapor.

At the same time, the second saturated lean liquid stream S14 described above is sent through a second throttle valve TV2, where its pressure is reduced to a pressure equal to a pressure of the spent stream S18 forming a lower pressure mixed vapor-liquid lean stream S19 having parameters as at a point 19, corresponding to a state of a vapor-liquid mixture.

The stream S19 is then mixed with the spent stream S18 to form a vapor-liquid lean solution stream S20 having parameters as at a point 20.

The stream S20 then enters into a first heat exchange unit or a condenser HE1, where it is cooled and fully condensed in counter flow with a coolant stream S51 in a coolant heat exchange process 51-52 or 20-1 to form the fully condensed lean stream S1 having the parameters as at the point 1 as described above and a spent coolant stream S52 having parameters as at a point 52.

Figure 1B:
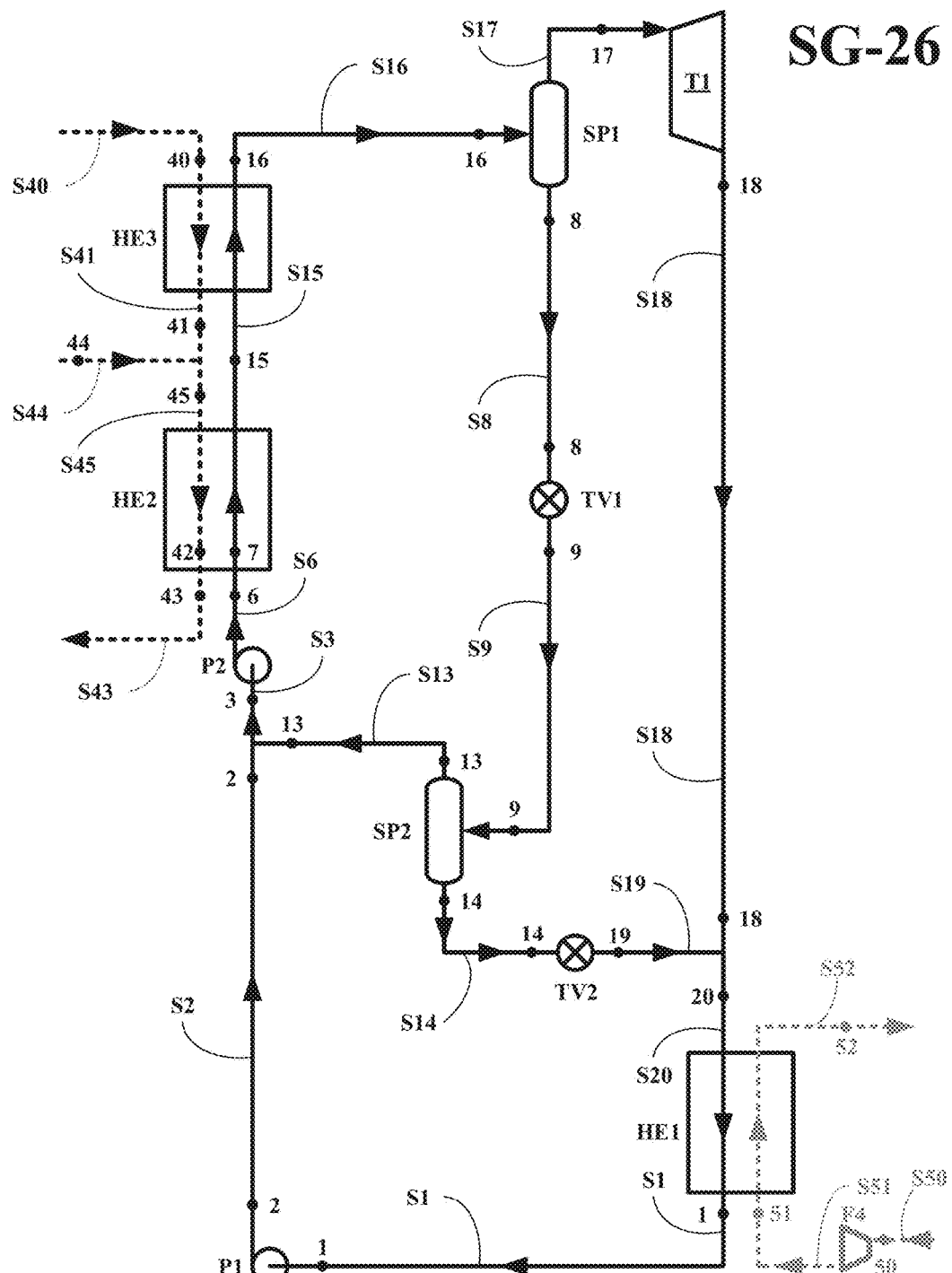
FIG. 1B depicts an embodiment of a power system for extracting energy from a production geothermal well and at least one initial geothermal well using a gaseous coolant and a fan F4.

The coolant enters the system as an initial coolant stream S50 having parameters as at a point 50, which is then sent into a coolant pump P4 in the case of a liquid coolant as shown in FIG. 1A or into a coolant fan F4 as shown in FIG. 1B, where its pressure is increased to form a pressurized coolant stream S51 having parameters as at a point 51. The stream S51 is then sent into the condenser HE1, where it cools and condenses the stream S20 in the coolant heat exchange process 20-1 or 51-52.

Meanwhile, a higher temperature heat source stream S40 having the parameters as at the point 40 enters into the third heat exchange unit HE3, where it is cooled in counter flow with the stream S15 providing heat for the third heat exchange process 15-16 or 40-41 as described above to form the cooled higher temperature heat source stream S41 having the parameters as at the point 41. The system is designed so that the temperature of the stream S41 at the point 41 is greater than or equal to an initial temperature of the lower temperature heat source stream S44 having the parameters as at the point 44 as described below.

The cool higher temperature heat source stream S41 is then mixed with the lower temperature heat source stream S44 having the parameters as at the point 44 as described above to form a combined heat source stream S45 having parameters as at point 45.

The combined heat source stream S45 is then sent into the second heat exchange unit HE2, where it is cooled in counter flow with the stream S6 providing heat for the second heat exchange process 6-7-15 or 45-42-43 as described above so that the combined stream S45 changes parameters from the point 45 to the point 42 and then to form the spent combined heat source stream S43 having the parameters as at the point 43, whereupon the combined heat source stream exits the system.

The system is closed.

In the systems of this invention, the pressure profile of the streams is tabulated in Table I, which the stream compositions from richest to leanest are tabulated in Table II.

TABLE I

| Stream Pressures | |
|---|---|
| Stream | Pressure |
| S6, S7, S15, S16, S17, and S8 | highest |
| S2, S3, S9, S13, and S14 | intermediate |
| S1, S18, S19, and S20 | lowest |

The systems of this invention establish a thermodynamic cycle including streams having three different pressures. The highest pressure streams pass through the vaporization subsystem including a feed pump P2, the second and third heat exchange units HE2 and HE3 and a first gravity separator SP1 and then through the energy extraction subsystem including the turbine T1. The lowest pressure streams are combined and fully condensed in the condensation subsystem including the first heat exchange unit HE1. The intermediate pressure streams are separated in a second separator SP2, pressurized in a first pump P1, combined with a lean solution stream to make a rich solution stream, reduced in pressure in a first throttle control valve TV1 before being fed to the separator SP2, reduced in pressures in a second throttle control valve TV2, and combined with the spent stream to form a lean solution stream in a separation and pressure reduction subsystem.

TABLE II

| Stream Compositions | | |
|---|---|---|
| Stream | Composition | Designation |
| S17 and S18 | richest | richer solution |
| S13 | richer | |
| S3, S6, S15, and S16 | rich | rich solution |
| S8 and S9 | lean | |
| S20, S1, and S2 | lean | lean solution |
| S14 and S19 | leanest | |

The lean solution streams S20, S1, and S2 and the stream S8 and S9 are leaner than the rich solution streams S3, S6, S15, and S16, but their relative leanness relative to each other will depend on the working fluid used and the operating parameters of the system so they are designated as only being lean.

In the systems of this invention, a flow rate of the higher temperature heat source stream S40 may be substantially lower than a flow rate of the lower temperature heat source stream S44. Modeling computations have shown that the systems of this invention may be operated properly with the flow rate of the higher temperature heat source stream S40 as low as 25% of the flow rate of the lower temperature heat source stream S44.

The flow rate of the higher temperature heat source streams S40 and S41 is adjusted so that the flow rate is sufficient to provide as much heat as is required in the third heat exchange process 15-16 or 40-41. In the case that the flow rate of the higher temperature heat source stream S40 is too small to provide the required heat for the third heat exchange process 15-16 or 40-41, then one of two options must be employed. In option one, a temperature of the stream S16 at the point 16 must be reduced so as to provide a balance between the heating process 15-16 and the cooling process 40-41 of the third heat exchange process 15-16 or 40-41. In the second option, a temperature difference between a temperature of the stream S45 at the point 42 and a temperature of the stream S6 at the point 7 has to be increased, i.e., the utilization of available heat from the lower temperature heat source stream S44 must be reduced. Either way, the total power output of the systems of this invention would be reduced. One experienced in the art may choose one or the other of these options, or a mix of both, to come up with an optimal available power output possible from a given set of heat sources.

The temperature differences between the heat source streams and the working fluid streams in the second heat exchange unit HE2 and the third heat exchange unit HE3 are substantially reduced as compared to a system that would have used only the higher temperature heat source stream S40. As a result, the thermodynamic irreversibility in the process of heat transfer from the heat source streams to the working fluid streams is substantially reduced and the system has a substantially higher 2nd Law efficiency as compared to a system that utilizes only the higher temperature heat source.

At the same time the thermal efficiency of the system remains as high as it would be in a system where only the higher temperature heat source is utilized.

Likewise, the total power produced in the present systems are substantially higher than would be possible with a conventional system using a mixture of higher temperature sources and lower temperature heat sources.

The present systems allow for the use of wells in geothermal fields, for power generation purposes, that would otherwise not have been useable due to having too low an initial temperature. This allows for a substantial reduction in a specific cost per kilowatt of power output for geothermal fields having at least one lower temperature stream, generally from initial site drilling and at least one higher temperature or production of heat source.

Figure 2:
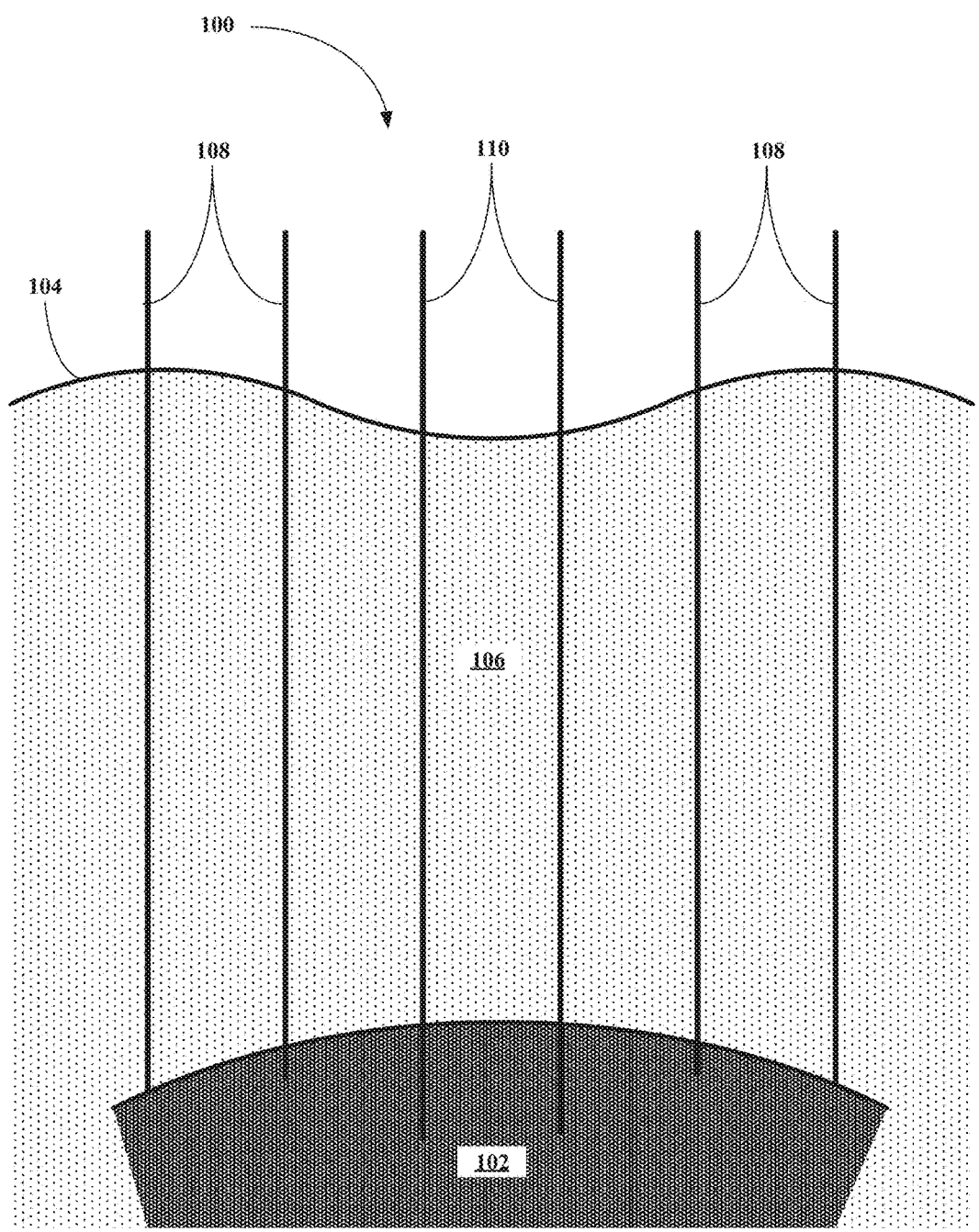
FIG. 2 depicts a geothermal field including two production wells and two initial wells.

Referring now to FIG. 2, a geothermal field 100 is shown to include a geothermal formation 102 below a surface 104 of the ground 106. Into the field 100, a set of initial wells 108 was drilled locating the geothermal formation 102 permitting a set of production wells 110 to be drilled into the geothermal formation 102. The production wells 110 supply the higher temperature heat source streams and the initial wells 108 supply the lower temperatures heat source streams.

All references cited herein are incorporated by reference. Although the invention has been disclosed with reference to its preferred embodiments, from reading this description those of skill in the art may appreciate changes and modification that may be made which do not depart from the scope and spirit of the invention as described above and claimed hereafter.

I claim:

1. A system for power generation comprising:
   a vaporization subsystem including:
      a booster pump to increase a pressure of an intermediate pressure rich solution stream to form a higher pressure rich solution stream,
      a lower temperature heat exchange portion to partially vaporize the higher pressure rich solution stream using a combined heat source stream comprising a cooled higher temperature heat source stream and a lower temperature heat source stream,
      a higher temperature heat exchange portion to further vaporize the higher pressure rich solution stream, and
      a first separator to separate the further vaporized higher pressure rich solution stream into a higher pressure lean liquid stream and a higher pressure vapor richer solution stream,
   an energy extraction subsystem including:
      at least one turbine to convert a portion of thermal energy in the higher pressure vapor richer solution stream into a usable form of energy to form a lower pressure richer solution stream,
   a separation and pressure reduction subsystem including:
      a first throttle control valve to reduce a pressure of the higher pressure lean liquid stream to form an intermediate pressure vapor-liquid lean stream,
      a second separator to separate the intermediate pressure vapor-liquid lean stream into an intermediate pressure rich vapor stream and an intermediate pressure leaner liquid stream,
      a first mixing valve to combine an intermediate pressure lean solution stream and the intermediate pressure rich vapor stream to form the intermediate pressure rich solution stream,
      a second throttle control valve to reduce the pressure of the intermediate pressure leaner liquid stream to form a lower pressure leaner liquid stream, and
      a second mixing valve to combine the lower pressure leaner liquid stream and the lower pressure richer solution stream to form a lower pressure lean solution stream, and
   a condensation subsystem including:
      a condenser to fully condense the lower pressure lean solution stream to form a lower pressure fully condensed lean solution stream, and
      a pump to increase a pressure of the lower pressure fully condensed lean solution stream to form the intermediate pressure lean solution stream.

2. The system of claim 1, wherein the streams, except for the heat source streams, comprise a multi-component working fluid.

3. The system of claim 2, wherein the multi-component working fluid comprises at least one lower boiling point component and at least one higher boiling point component.

4. The system of claim 3, wherein the multi-component fluid is selected from the group consisting of an ammonia-water mixture, a mixture of two or more hydrocarbons, a mixture of two or more halocarbons, a mixture of hydrocarbons and halocarbons, and mixtures thereof.

5. The system of claim 1, wherein a flow rate of the higher temperature heat source stream is lower than a flow rate of the lower temperature heat source stream.

6. The system of claim 5, wherein the flow rate of the higher temperature heat source stream is as low as 25% of the flow rate of the lower temperature heat source stream.

7. The system of claim 5, wherein the higher temperature heat source stream is adjusted so that the flow rate is sufficient to provide as much heat as is required in the higher temperature heat exchange portion.

8. The system of claim 5, wherein if the flow rate of the higher temperature heat source stream is too small to provide the required heat for the higher temperature heat exchange portion, then a temperature of the higher pressure partially vaporized rich solution stream is reduced so as to provide a balance between the heating process and the cooling process of the higher temperature heat exchange portion.

9. The system of claim 5, wherein if the flow rate of the higher temperature heat source stream is too small to provide the required heat for the higher temperature heat exchange portion, then a temperature difference between a temperature of the lower temperature heat source stream and a temperature of the higher pressure rich solution stream at the point within the lower temperature heat exchange portion is increased so that the utilization of available heat from the lower temperature heat source stream is reduced.

10. The system of claim 1, wherein flow rates of the heat source streams are varied to optimize a power output of the system.

11. The system of claim 1, wherein the temperature differences between the heat source streams and the higher pressure rich solution stream in the lower temperature heat exchange portion and the higher temperature heat exchange portion are reduced as compared to a system using only the higher temperature heat source stream.

12. The system of claim 1, wherein a thermodynamic irreversibility of heat transfer from the heat source streams to the higher pressure rich solution stream is reduced in the system and the system has a higher 2nd Law efficiency $(1-T_C/T_H)$ as compared to a system that utilizes only the higher temperature heat source stream.

13. The system of claim 1, wherein a thermal efficiency of the system $(1-Q_{out}/Q_{in})$ remains as high as a system using only the higher temperature heat source stream.

14. The system of claim 1, wherein a total power produced in the system is higher than a system using a mixture of the higher temperature heat source stream and the lower temperature heat source stream.

15. The system of claim 1, wherein the lower temperature heat source stream comprises initial wells drilled into a geothermal field and the higher temperature heat source stream comprises production wells in the geothermal field.

16. A method for power generation comprising:
increasing a pressure of an intermediate pressure rich solution stream in a booster pump of a vaporization subsystem to form a higher pressure rich solution stream,
partially vaporizing the higher pressure rich solution stream in a lower temperature heat exchange portion of the vaporization subsystem using a combined heat source stream comprising a cooled higher temperature heat source stream and a lower temperature heat source stream,
further vaporizing the higher pressure rich solution stream in a higher temperature heat exchange portion of the vaporization subsystem,
separating the further vaporized higher pressure rich solution stream in a first separator into a higher pressure lean liquid stream and a higher pressure vapor richer solution stream,
converting a portion of thermal energy in the higher pressure vapor richer solution stream into a usable form of energy in at least one turbine of an energy extraction subsystem to form a lower pressure richer solution stream,
reducing a pressure of the higher pressure lean liquid stream in a first throttle control valve of a separation and pressure reduction subsystem to form an intermediate vapor-liquid lean stream,
separating the intermediate vapor-liquid lean stream in a second separator of the separation and pressure reduction subsystem into an intermediate pressure rich vapor stream and an intermediate pressure leaner liquid stream,
combining an intermediate pressure lean solution stream and the intermediate pressure rich vapor stream in a first mixing valve of the separation and pressure reduction subsystem to form the intermediate pressure rich solution stream,
reducing the pressure of the intermediate pressure leaner liquid stream in a second throttle control valve of the separation and pressure reduction subsystem to form a lower pressure leaner liquid stream, and
combining the lower pressure leaner liquid stream and the lower pressure richer solution stream in a second mixing valve of the separation and pressure reduction subsystem to form a lower pressure lean solution stream,
fully condensing the lower pressure lean solution stream in a condenser of a condensation subsystem to form a lower pressure fully condensed lean solution stream, and
increasing a pressure of the lower pressure fully condensed lean solution stream in a pump of the condensation subsystem to form the intermediate pressure lean solution steam.

17. The method of claim 16, wherein the streams, except for the heat source streams, comprise a multi-component working fluid.

18. The method of claim 17, wherein the multi-component working fluid comprises at least one lower boiling point component and at least one higher boiling point component.

19. The method of claim 18, wherein the multi-component fluid is selected from the group consisting of an ammonia-water mixture, a mixture of two or more hydrocarbons, a mixture of two or more halocarbons, a mixture of hydrocarbons and halocarbons, and mixtures thereof.

20. The method of claim 16, wherein a flow rate of the higher temperature heat source stream is lower than a flow rate of the lower temperature heat source stream.

21. The method of claim 20, wherein the flow rate of the higher temperature heat source stream is as low as 25% of the flow rate of the lower temperature heat source stream.

22. The method of claim 20, wherein the higher temperature heat source stream is adjusted so that the flow rate is sufficient to provide as much heat as is required in the higher temperature heat exchange portion.

23. The method of claim 20, wherein if the flow rate of the higher temperature heat source stream is too small to provide the required heat for the higher temperature heat exchange portion, then a temperature of the higher pressure partially vaporized rich solution stream is reduced so as to provide a balance between the heating process and the cooling process of the higher temperature heat exchange portion.

24. The method of claim 20, wherein if the flow rate of the higher temperature heat source stream is too small to provide the required heat for the higher temperature heat exchange portion, then a temperature difference between a temperature of the lower temperature heat source stream and a temperature of the higher pressure rich solution stream at the point within the lower temperature heat exchange portion is increased so that the utilization of available heat from the lower temperature heat source stream is reduced.

25. The method of claim 16, wherein flow rates of the heat source streams are varied to optimize a power output of the system.

26. The method of claim 16, wherein the temperature differences between the heat source streams and the higher pressure rich solution stream in the lower temperature heat exchange portion and the higher temperature heat exchange portion are reduced as compared to a system using only the higher temperature heat source stream.

27. The method of claim 16, wherein a thermodynamic irreversibility of heat transfer from the heat source streams to the higher pressure rich solution stream is reduced in the system and the system has a higher 2nd Law efficiency $(1-T_C/T_H)$ as compared to a system that utilizes only the higher temperature heat source stream.

28. The method of claim 16, wherein a thermal efficiency of the system $(1-Q_{out}/Q_{in})$ remains as high as a system using only the higher temperature heat source stream.

29. The method of claim 16, wherein a total power produced in the system is higher than a system using a mixture of the higher temperature heat source stream and the lower temperature heat source stream.

30. The method of claim 16, wherein the lower temperature heat source stream comprises initial wells drilled into a geothermal field and the higher temperature heat source stream comprises production wells in the geothermal field.

* * * * *